March 15, 1960     G. E. LAMB     2,928,335
BALE HEIGHT CONTROL MEANS FOR BALING PRESSES
Filed Dec. 9, 1957     2 Sheets-Sheet 1

INVENTOR.
GEORGE E LAMB
BY
Robinson & Berry
ATTORNEYS

March 15, 1960  G. E. LAMB  2,928,335
BALE HEIGHT CONTROL MEANS FOR BALING PRESSES
Filed Dec. 9, 1957  2 Sheets-Sheet 2
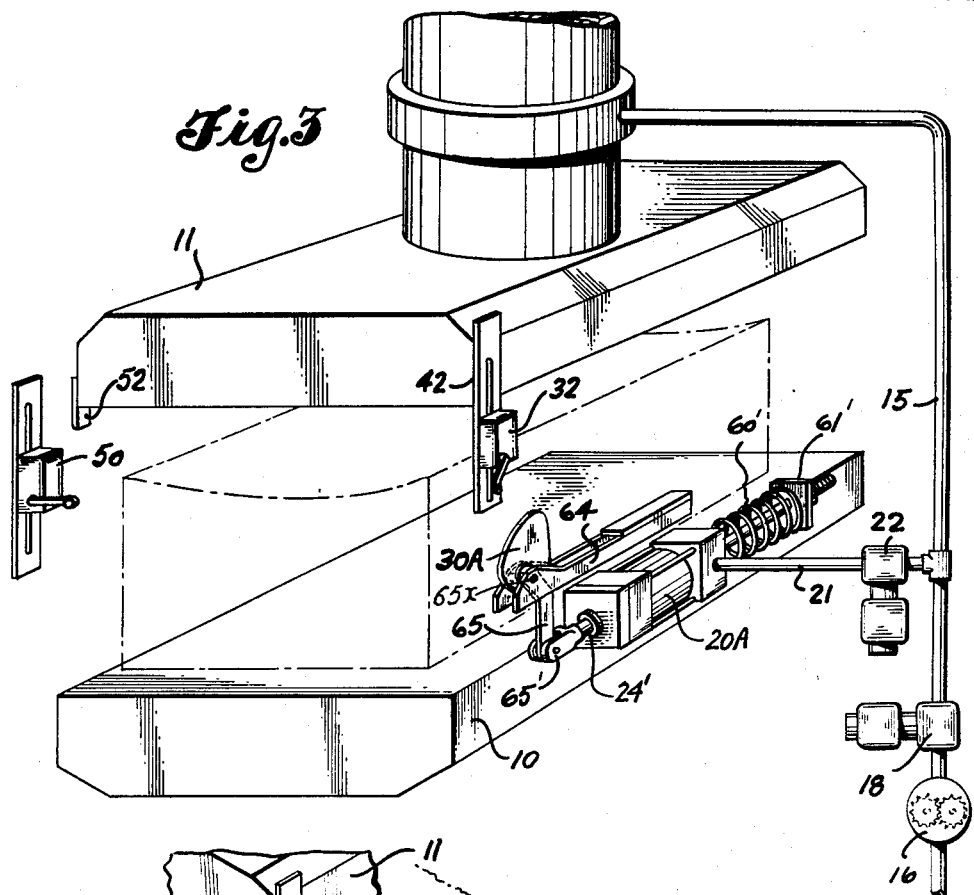
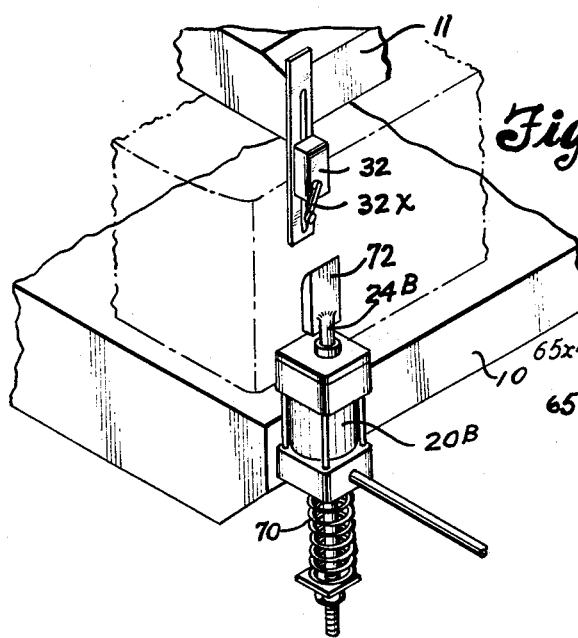
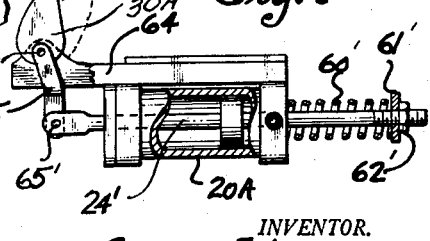
INVENTOR.
GEORGE E. LAMB
BY
Robinson & Berry
ATTORNEYS

United States Patent Office 2,928,335
Patented Mar. 15, 1960

2,928,335

BALE HEIGHT CONTROL MEANS FOR BALING PRESSES

George E. Lamb, Hoquiam, Wash., assignor to Lamb-Grays Harbor Co., Inc., Hoquiam, Wash.

Application December 9, 1957, Serial No. 701,615

10 Claims. (Cl. 100—256)

This invention relates to improvements in presses as employed for the baling of pulp. More particularly it pertains to a novel bale height control mechanism for use with pulp baling presses.

In the pulp making and shipping industry the making of pulp bales of uniform height is much desired but is difficult to obtain. First by reason of the "spring back" of the baled material when the baling pressure is released and, second, due to the fact that the spring back is not uniform for pulp of different kinds nor of like pulps of different moisture content.

The uniform bale height is especially desired since, if they are not of a constant size they are difficult to stack, and bad stacking creates hazards in storage areas where high stacking is necessary. A uniform bale height is much desired when the baled pulp is to be exported since freight rates are based on the cubic foot ton as measured on the largest bales. It is also desired because bales of non-uniform height are more difficult to unload from the ships and barges as the ships' slings have to skid the bales therein over the layer of bales just below them and if some of the bales project above the level of others in that layer, the bale being unloaded will hang up on the projecting bales, causing an excessive strain on the baling straps by which the bale is being lifted. It will also be mentioned that the baling straps are made with minimum allowable weight that will give the required strength in order to reduce the tare weight on the bale and this increases the desirability to avoid unevenness in the height of the bales as loaded for export.

It is for the above stated reasons that a great deal of attention is now being given to the obtaining of uniform bale height and it is for that purpose that the present invention has been provided. It will be mentioned, however, that pulp baling presses, as heretofore manufactured have been provided with bale height control means; one being referred to as "pressure control" and the other as a "position control" means.

The pressure control means is so arranged that the press ram applies an adjustable pressure to the pulp stack, holds that adjustable pressure for an adjustable time interval and then opens. The position control means provides that the press shall apply pressure in such amount as to reduce the stack to an adjustable height where it is held for an adjustable time period and then opens.

The pressure control means is not entirely satisfactory due to the fact that the pulp that is contained in various stacks varies in moisture content and the sheets making up the various stacks vary in caliper. Therefore, the number of sheets per stack of any given weight will vary in height. In pulp mills where variations are extreme, the bale height variation also will be extreme. In mills that very carefully control the sheet characteristics, this method of controlling the bale height is reasonably acceptable but, outside of mills producing chemical cellulose, careful control of sheet characteristics is most unusual.

In using the above mentioned position control means, which provides that the press shall apply such pressure as may be required to reduce the bale to a predetermined height and then hold it at that height for a predetermined period, results are not entirely satisfactory because the inherent spring back of the various bales with the opening of the press will be to different extent. This spring back is due to various factors, some of which have been determined, and from those known factors numerous curves have been developed that indicate that the spring back for a pulp made from a given specie of wood, by a given process, bears a definite relationship to the pressure required to compress the stack. For some pulps, the developed curves follow a substantially straight line, while for others, the curves follow a curved line.

Through my analysis of the problem, I have concluded that there are two methods of improving the uniformity of bale height; the first of which applies to bales of pulp having characteristics which cause the spring back curve to follow a straight line and the other applies to bales of pulp having those characteristics that cause the spring back curves to follow a curved line.

In view of the above noted conclusions, it has been the primary object of this invention to provide bale height control means for use in conjunction with pulp baling presses whereby bales of pulp made of certain known species of wood, by a certain known process, may be pressed and when released from pressure, all will assume a definite and predetermined height.

It is a further object of this invention to provide bale height control means of the above stated character that is relatively simple in construction and is easily applicable to present day baling presses.

Further objects and advantages of the invention reside in the details of construction and combination of parts embodied therein; and in the mode of use of the invention as will hereinafter be fully described.

In accomplishing the above mentioned and other objects, I have provided the improved details of construction, the preferred forms of which are illustrated in the accompanying drawings, wherein:

Fig. 3 is a diagrammatic view of a baling press showing use therewith of an alternative form of bale height control means.

Fig. 4 is an elevation of the control means of Fig. 3, shown partly in section.

Fig. 5 is a perspective view of an alternative arrangement applicable to the device of Fig. 3.

Figure 1:
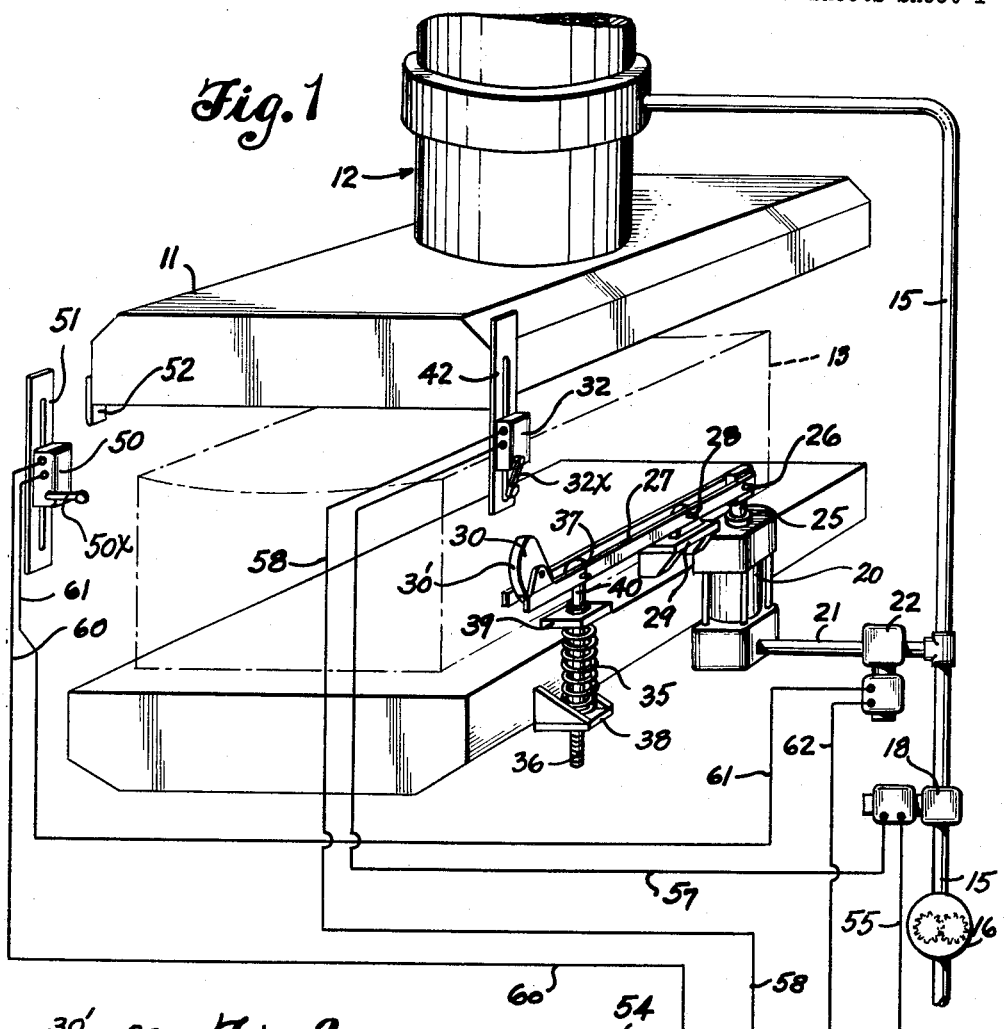
Fig. 1 is a view diagrammatically representing the lower and upper platens of a baling press between which a stack of pulp sheets may be pressed and showing one form of a bale height control means, embodied by this invention, as used in conjunction with the press, also showing a wiring diagram for the electrical device.

Referring more in detail to the drawings and first giving consideration to the bale height control means of Fig. 1 which is based upon a method which calls for compressing the bale to a given height, measuring the pressure at that point, and from this pressure set the final height to which the bale should be compressed before being released.

In the diagrammatic showing of a typical press, 10 designates the lower platen and 11 designates the complemental or coacting upper platen; this latter platen being herein shown as equipped with a hydraulic ram, designated in its entirety by numeral 12, for actuating the platen 11 downwardly against a pulp stack when disposed between the platens to compress it preparatory to baling; such a bale being shown in dash lines at 13 in Fig. 1. For the closing of the press, a hydraulic pressure medium is delivered into the ram cylinder through a pipe line 15. This pipe line leads from a pressure pump diagrammatically indicated at 16. The application of this medium is under control of a solenoid valve 18 interposed in pipe line 15. Control of the valve is effected by means presently described.

Figure 2:
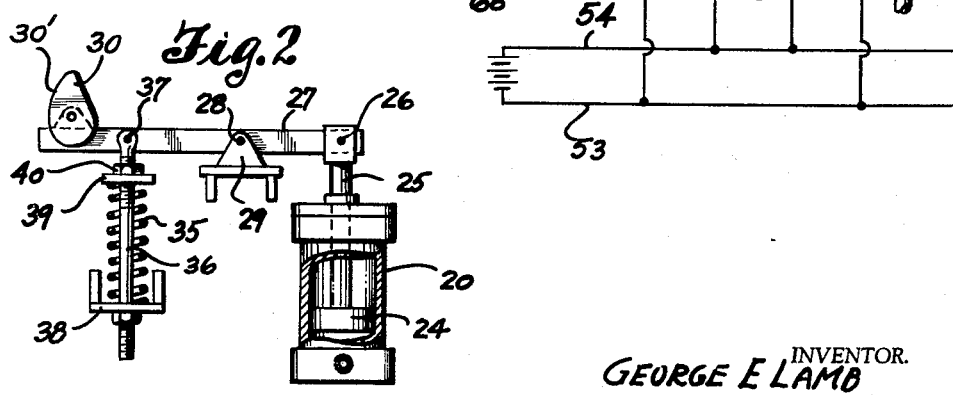
Fig. 2 is an elevation of the control means shown in Fig. 1, with certain parts partly in section for better understanding.

Assuming that the pulp stack 13 that is to be baled is of pulp made from a certain specie of wood and by a certain process that has previously been determined as being in that category where the spring back curve follows a straight line, the bale height control apparatus of Figs. 1 and 2 would be employed. This apparatus comprises the vertically disposed hydraulic cylinder 20 that is fixed by any suitable means relative to the lower platen 10. Extended to the lower end of cylinder 20 is a hydraulic pressure pipe line 21. This leads from pipe line 15 to a point therein that is between ram 12 and valve 18. The application of the pressure medium to cylinder 20 is controlled by a solenoid valve 22 interposed in pipe line 21. When valve 22 is open, the hydraulic pressure in cylinder 20 will equal that applied to the ram cylinder.

The hydraulic cylinder 20 contains a piston 24 from which a piston rod 25 extends, passing upwardly from the cylinder. This rod is pivotally connected at its upper end, as at 26, with what will be referred to herein as the inner end of a horizontally directed lever 27 that is pivotally supported intermediate its ends, by a horizontal pivot shaft 28 supported by a bracket 29 that is fixed relative to the cylinder 20. At its outer end, lever 27 mounts a cam 30 formed with an upwardly facing camming surface 30' positioned to coact with a circuit control switch 32, as will presently be explained.

The lever 27 is yieldingly supported at its outer end by a coiled spring 35; this spring being applied about a vertical guide rod 36 which has a pivot pin connection 37 at its upper end with lever 27 near the outer end of the latter and which bolt passes slidably, at its lower end, through a hole in a spring supporting bracket 38 here shown to be fixed to the platen 10. The spring 35 rests at its lower end on the bracket 38 and at its upper end bears upwardly against a plate 39 which may be adjusted along the rod to regulate or establish the desired tension of the spring. Adjustment is effected in this instance by means of a nut 40 that is threaded on the rod to engage the top side of the plate 39.

The circuit control switch 32, previously mentioned, is mounted on a vertical plate 42 that is fixed to the platen 11. This switch is vertically adjustable on the plate and it is held thereby above the cam 30 in position for actuation of the switch lever 32x by the cam surface 30' upon closing of the press platens to a predetermined spacing. This switch controls the opening and closing of the solenoid valve 18 as presently explained.

The solenoid valve 22 which controls the application of hydraulic pressure medium to the cylinder 20 is under control of a circuit switch 50 mounted for vertical adjustment on a fixed plate 51. The switch 50 has an actuating lever arm 50x extended to a position for actuation by a cam plate 52 that is fixed to platen 11, as the press closes. The switch is vertically adjustable on plate 51 thus to establish the extent to which the press may close before valve 22 is closed.

Circuit connections with current supply lines, designated in Fig. 1 at 53 and 54 for control of the valves 18 and 22 are diagrammatically indicated in Fig. 1 wherein it is shown that the solenoid valve 18 has one side electrically connected by a circuit wire 55 with the circuit supply line 53 and has its other side connected by wire 57 with one side of switch 32; the other side of the switch 32 being connected by wire 58 with current supply line 54.

Normally, that is, at the start of a stack pressing operation, switch 32 is open and valve 18 is open. The switch will be closed during the pressing operation when the downward movement of platen 11 causes the switch arm 32x to be thrown to closing position by its contact with cam 30. The closing of switch 32 energizes solenoid valve 18 to close it and retain the pressure that has been built up in the ram 12.

The switch 50 has one side electrically connected by a circuit wire 60 with supply line 53 and its other side connected by a circuit wire 61 with one side of solenoid valve 22; the other side of the valve being electrically connected by circuit wire 62 with current supply line 54. Normally switch 50 is open and valve 22 is open. When switch 50 is closed by cam 52 moving downwardly and operatively engaging switch lever 50x, the valve 22 will be closed.

Assuming the press to be open for reception of a stack of pulp 13 for compression preparatory to baling and the circuit control switches 32 and 50 open, and the valves 18 and 22 also open, the bale height control operation is as follows:

Prior to beginning the pressing operation, the switch 50 is adjusted vertically along plate 51 and secured at a position at which the switch arm 50x will be actuated by cam 52 when the platen 11 has compressed the stack to that adjustable height which has previously been determined to be the average height at a given pressure, for example, at 200 tons per square inch. Also, before starting the pressing operation, the switch 32 is vertically adjusted on plate 42 and secured at a proper level.

Hydraulic pressure medium is then caused to be applied by pump 16 through valve 18 and pipe line 15 to ram 12 to cause the upper platen 11 to move downwardly against the stack 13 to compress it. This same hydraulic pressure will be applied through pipe lines 15, 21 and the open valve 22 to cylinder 20, acting upwardly on piston 24 to cause the outer end of lever 27 to move downwardly against the resisting force of spring 35 and thus establish the functioning level of cam 30. As the pressure in cylinder 20 increases, the cam is lowered accordingly.

The extent of compression of spring 35 can be varied by the adjustment of nut 40 to adjust the position of cam 30 under variable pounds per square inch pressures, and switch 32 can then be located at a level on its mounting plate 42 to suit the ultimate compression ratio desired on the stacks.

With the switch 50 properly positioned, it will be thrown by cam 52 at the same instant the stack has been compressed to that predetermined average height for bales placed under the pressing pressure being applied. The ultimate actuation of switch 50 energizes the solenoid valve 22 and closes it, thus locking the hydraulic pressure medium in cylinder 20 and holding the cam 30 at a definite level.

After the valve 22 has been closed, the compressing force of the ram is built up until the switch 32 is tripped by contact of its arm 32x with cam 30. This closes valve 18 and stops further closing travel of the press platen 11. It also retains the stack under that pressure until the press is opened.

The alternative device which I have shown in Figs. 3 and 4 relates to that other of the two methods previously referred to in which the extent of final compression by the upper platen after closing the pressure line to the cylinder 20 will be more or less in accordance with the pressure employed in the ram.

In this form of device, the hydraulic cylinder 20A is horizontally disposed and the piston rod 24' extends from both ends of the cylinder. A coil spring 60' is applied about the rearward end of the piston rod to seat against a plate 61' and is maintained under an adjustable compression by a nut 62' threaded on the rod. Fixed on top of and extending forwardly from the cylinder is a horizontal arm 64 which, at its forward end, mounts a lever 65 by means of a horizontal pin 65x directed transversely of the arm. Lever 65 extends downwardly from the arm 64 and is pivotally connected at its lower end, as at 65', to the forward end of the piston rod 24', and at its upper end is fixed to the cam 30A which is disposed in position for actuation of switch 32 to effect the closing of valve 22 when the stack has been compressed to a predetermined average height for bales under the pressure being used. In this device the cam 30A will be rocked to different positions in accordance with the extent of the forward movement of the piston rod as subjected to the hydraulic pressure medium in the cylinder and resisting force of the coil spring 60. The shape of the cam 30A will be dependent upon the characteristics of the "pressure bale displacement" curve diagram.

As an alternative, a form of device for actuation of switch 32 is shown in Fig. 5. In this, the cylinder 20B is vertically disposed and it is located below and in vertical alignment with the switch 32. The piston rod 24B extends from opposite ends of the cylinder and at its lower end is equipped with a coiled spring 70 as in the device of Fig. 3. At its upper end the rod carries a cam block 72 against which the switch arm 32 will contact to actuate the switch and effect the closing of valve 18.

In the use of these devices, the functioning position of cam 30 or of cam 30A is established by the pressure applied to and retained within the cylinder 20 by the closing of solenoid valve 22 which takes place when the stack has been reduced to an average height under the hydraulic pressure being used. Then further pressing to suit the ultimate compression ratio desired on the bale is controlled by the proper positioning of switch 32 relative to the actuating cam 30.

By use of these devices in accordance with the foregoing explanatory matter, bales of uniform height can be formed and the difficulties that occur when bales are not of constant size, are eliminated.

What I claim as new is:

1. In a bale press of the character described having coacting platens, a hydraulic ram for closing the press to compress a bale that is placed between the platens, a pressure pipe leading to the ram cylinder and means for supplying a fluid pressure medium to the ram through said pressure pipe; a normally open shut-off valve in said pressure pipe, a pressure cylinder having a pipe connection with said pressure pipe at a point between the ram and shut-off valve, a normally open shut-off valve in said pipe connection, means operable by the closing together of the press platens for closing the second mentioned shut-off valve to stabilize the pressure cylinder upon the bale under compression being reduced to a predetermined average height for bales when placed under the pressure being employed, and means, controlled by the said pressure cylinder as stabilized by said second mentioned shut-off valve to effect the closing of the first mentioned shut-off valve when the bale has been further reduced by closing action of the press, to a predetermined extent.

2. The combination recited in claim 1 including means for varying the extent of closing of the press required for effecting the closing of said second shut-off valve, and for varying the extent of additional closing movement of the press for effecting the closing of the first mentioned shut-off valve.

3. In combination with a bale press having a stationary lower platen, a movable upper platen, a hydraulic ram for applying force to the upper platen for compressing a bale placed between the platens, a pressure pipe leading to the ram cylinder and means for supplying a fluid pressure medium to the latter through said pressure pipe; a bale height control means comprising a normally open solenoid valve applied to said pressure pipe, an electric circuit for said solenoid valve including a normally open control switch that is movable with the upper platen, a pressure cylinder having a pipe connection with said pressure pipe at a point between the ram and said solenoid valve, a normally open solenoid valve in said pipe connection, an electric circuit for the last mentioned solenoid valve including a normally open control switch, a switch actuator member that is movable toward and from the first mentioned switch in accordance with decrease and increase of pressure as applied to said pressure cylinder, another switch actuator member movable with the upper platen for closing the second mentioned switch when the bale under compression has been reduced to a predetermined average height for bales when placed under the pressure being employed, thus to effect the closing of the second mentioned solenoid valve to lock the pressure medium in the pressure cylinder and stabilize the position of adjustment of the first mentioned switch actuator member; said first mentioned switch having a closing lever positioned to be engaged with the stabilized switch actuator member to close the switch and effect the closing of the first mentioned solenoid valve thus to retain the pressure in the ram incident to the bale being reduced in height to a predetermined additional extent.

4. The combination recited in claim 3 wherein the first mentioned switch has a mounting plate fixed to the upper platen and said switch is adjustably fixed to said plate to provide for lessening or increasing the travel distance of said switch before its actuation by contact with the first mentioned switch actuator after the position of said actuator has been established by the closing of the second mentioned solenoid valve.

5. The combination recited in claim 3 wherein the second mentioned switch has a fixed mounting plate on which it is adjustably mounted to provide for an increase or decrease in the closing travel of the upper platen before the switch is closed to effect the closing of the second mentioned solenoid valve.

6. The combination recited in claim 3 wherein the first mentioned switch has a mounting plate fixed to the upper platen and said switch is adjustably fixed to said plate to provide for lessening or increasing the travel distance of said switch before being actuated by its actuator after the position of the latter has been established by the closing of the second mentioned solenoid valve and wherein the second mentioned switch has a fixed mounting plate and is adjustably mounted thereon to provide for an increase or decrease in the closing travel of the movable platen before said second mentioned switch is actuated to close the second mentioned solenoid valve.

7. The device of claim 3 wherein the first mentioned switch actuator comprises a cam, and the pressure cylinder has a spring loaded piston movable therein under influence of the pressure medium, a piston rod extended in the cylinder and adjustably mounting the cam to establish its position for the contact therewith of said switch lever thus to increase or decrease the platen movement before the first mentioned solenoid valve is closed.

8. The device of claim 3 wherein the said pressure cylinder has a piston therein, acted on by the pressure medium as applied through the pipe connection and a piston rod extends from the cylinder, a lever supported between its ends by a fixed pivot; said lever having pivotal conection at one end with the piston rod and mounting the first mentioned switch actuator at its opposite end.

9. The device of claim 8 wherein a spring acts to yieldingly resist movement of said lever under increasing pressure in the pressure cylinder.

10. The device of claim 8 wherein a spring acts to yieldingly resist movement of said lever under increasing pressure in the pressure cylinder and means for adjusting the resistance of the spring to lever movement.

References Cited in the file of this patent
UNITED STATES PATENTS
2,810,930 MacDonald et al. _____ Oct. 29, 1957